(12) United States Patent
Albert et al.

(10) Patent No.: US 7,152,200 B2
(45) Date of Patent: Dec. 19, 2006

(54) INTERNET-BASED DATABASE REPORT WRITER AND CUSTOMER DATA MANAGEMENT SYSTEM

(75) Inventors: Russ L. Albert, Westminster, CO (US); Michelle L. Specht, St. Aurora, CO (US); Jeremy L. Eagleman, Snohomish, WA (US); Randi J. Parker, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/001,643

(22) Filed: Dec. 31, 1997

(65) Prior Publication Data

US 2004/0205487 A1 Oct. 14, 2004

(51) Int. Cl.
*G06F 15/00* (2006.01)
(52) U.S. Cl. ........................... 715/500; 379/126
(58) Field of Classification Search ................ 707/501, 707/500, 2, 3, 501.1; 705/30, 40, 34; 709/203; 715/500, 530; 379/126, 121.06, 114.01, 379/114.03, 114.04
See application file for complete search history.

(56) References Cited

U.S. PATENT DOCUMENTS

| | | | | |
|---|---|---|---|---|
| 4,513,175 A | * | 4/1985 | Smith .................... 379/357.04 |
| 4,799,156 A | * | 1/1989 | Shavit et al. .................. 705/26 |
| 5,287,270 A | * | 2/1994 | Hardy et al. .................... 705/34 |
| 5,325,290 A | * | 6/1994 | Cauffman et al. ............. 705/34 |
| 5,423,033 A | * | 6/1995 | Yuen ............................ 707/4 |
| 5,425,102 A | * | 6/1995 | Moy ....................... 713/183 |
| 5,481,600 A | * | 1/1996 | Alesio .................... 379/114.15 |
| 5,495,600 A | * | 2/1996 | Terry et al. ..................... 707/3 |
| 5,600,364 A | * | 2/1997 | Hendricks et al. ............. 725/9 |
| 5,696,906 A | * | 12/1997 | Peters et al. .................. 705/34 |
| 5,710,900 A | * | 1/1998 | Anand et al. .................. 707/3 |
| 5,721,903 A | * | 2/1998 | Anand et al. .................. 707/5 |
| 5,727,196 A | * | 3/1998 | Strauss, Jr. et al. ............. 707/2 |
| 5,732,128 A | * | 3/1998 | Bushnell ..................... 379/119 |
| 5,737,414 A | * | 4/1998 | Walker et al. ................ 705/40 |
| 5,761,650 A | * | 6/1998 | Munsil et al. ................ 705/34 |
| 5,772,585 A | * | 6/1998 | Lavin et al. ................ 600/300 |
| 5,802,352 A | * | 9/1998 | Chow et al. ................ 707/517 |
| 5,832,460 A | * | 11/1998 | Bednar et al. ................ 705/27 |
| 5,835,580 A | * | 11/1998 | Fraser .................... 379/115.01 |
| 5,842,174 A | * | 11/1998 | Yanor ............................ 705/1 |
| 5,844,972 A | * | 12/1998 | Jagadish et al. ........ 379/114.15 |
| 5,852,659 A | * | 12/1998 | Welter, Jr. .................. 379/116 |

(Continued)

OTHER PUBLICATIONS

Sprague, Automated Small Business Legal Counseling Systems, IEEE, Mar. 1990, pp. 772-778.*

*Primary Examiner*—Cong-Lac Huynh
(74) *Attorney, Agent, or Firm*—Townsend and Townsend and Crew LLP

(57) ABSTRACT

A database report writer and customer data management system and method provides a GUI type interface to allow users convenient on-line access, such as via the Internet, to customer billing and inventory data in the form of an on-line report. The present invention facilitates on-line creation of report definitions which specify desired data to be produced in a report, and other parameters relating to display, sorting, accounting, grouping, and filtering of report information. The present invention also allows users to create custom database tables and input their own data for display in reports along with billing and inventory data. As a result, the present invention provides the ability to eliminate conventional hardcopy reports typically produced in the form of a billing statement.

12 Claims, 2 Drawing Sheets

U.S. PATENT DOCUMENTS

| | | | |
|---|---|---|---|
| 5,852,812 A * | 12/1998 | Reeder | 705/39 |
| 5,864,871 A * | 1/1999 | Kitain et al. | 707/104 |
| 5,867,651 A * | 2/1999 | Dan et al. | 709/203 |
| 5,884,284 A * | 3/1999 | Peters et al. | 705/30 |
| 5,893,077 A * | 4/1999 | Griffin et al. | 705/34 |
| 5,918,014 A * | 6/1999 | Robinson | 707/10 |
| 5,930,764 A * | 7/1999 | Melchione et al. | 705/10 |
| 5,943,406 A * | 8/1999 | Leta et al. | 379/120 |
| 5,956,690 A * | 9/1999 | Haggerson et al. | 705/3 |
| 5,966,695 A * | 10/1999 | Melchione et al. | 705/10 |
| 5,991,380 A * | 11/1999 | Bruno et al. | 379/114.15 |
| 6,023,499 A * | 2/2000 | Mansey et al. | 379/111 |
| 6,024,281 A * | 2/2000 | Shepley | 235/375 |
| 6,026,157 A * | 2/2000 | Gulik et al. | 379/265.01 |
| 6,032,132 A * | 2/2000 | Nelson | 705/34 |
| 6,035,281 A * | 3/2000 | Crosskey et al. | 705/14 |
| 6,044,259 A * | 3/2000 | Hentila et al. | 455/406 |
| 6,044,362 A * | 3/2000 | Neely | 705/34 |
| 6,046,824 A * | 4/2000 | Barak | 358/400 |
| 6,052,448 A * | 4/2000 | Janning | 379/115.01 |
| 6,058,170 A * | 5/2000 | Jagadish et al. | 379/119 |
| 6,064,375 A * | 5/2000 | Velez et al. | 705/38 |
| 6,064,987 A * | 5/2000 | Walker et al. | 705/30 |
| 6,069,941 A * | 5/2000 | Byrd et al. | 379/121.06 |
| 6,112,192 A * | 8/2000 | Capek | 705/59 |
| 6,125,173 A * | 9/2000 | Jagadish et al. | 379/114.1 |
| 6,141,663 A * | 10/2000 | Hunkins et al. | 707/201 |
| 6,154,753 A * | 11/2000 | McFarland | 715/508 |
| 6,160,549 A * | 12/2000 | Touma et al. | 345/762 |
| 6,205,210 B1 * | 3/2001 | Rainey et al. | 379/114.28 |
| 6,286,039 B1 * | 9/2001 | Van Horne et al. | 709/221 |
| 6,385,444 B1 * | 5/2002 | Peschel et al. | 455/405 |
| 6,438,746 B1 * | 8/2002 | Martin | 717/149 |
| 6,459,779 B1 * | 10/2002 | Wardin et al. | 379/112.01 |
| 6,754,320 B1 * | 6/2004 | Daase et al. | 379/121.01 |

* cited by examiner

INTERNET-BASED DATABASE REPORT WRITER AND CUSTOMER DATA MANAGEMENT SYSTEM

TECHNICAL FIELD

The present invention generally relates to processing of customer billing and inventory information, and more particularly to improvements which allow customer access to such information via an Internet based connection.

BACKGROUND ART

Generally, the dramatic growth in use of the Internet has created greater opportunities for service providers to introduce new services to customers which are tailored to take advantage of the increased speed and efficiency offered by the Internet.

One such area involves processing of customer account data relating to services rendered, and generating associated billing reports for each customer. Of particular concern to the present invention is providing access to customer billing and inventory data to users located both in and outside a service provider such as a telephone company.

To date, processing and billing arrangements rely on traditional mailing of hardcopy bills to customer premises, and automated telephone and service support staff to allow users access to billing and inventory data. As such, known arrangements have not otherwise tapped the potential for increased efficiency and convenience offered by a graphical user interface (GUI) via the Internet. Alternative arrangements have been introduced, but are typically packaged on a CD-ROM or diskette and are severely limited in capabilities to provide enhanced customer service. In other words, these known arrangements do not provide any drill down capability, entry of customer data, or comprehensive database access and management.

DISCLOSURE OF THE INVENTION

It is therefore an object of the present invention to provide a database report writer and customer data management system and method which increases convenience and efficiency of user access to billing information.

It is another object of the present invention to provide a database report writer and customer data management system and method which allows user access via the Internet using a GUI.

It is yet another object of the present invention to provide a database report writer and customer data management system and method which allows a user to customize and save report definitions.

It is a further object of the present invention to provide a database report writer and customer data management system method which allows direct online user access to billing and other related customer information to provide the ability or opportunity to eliminate the need for mailing of hardcopy billing reports.

In accordance with these and other objects, the present invention provides a database report writer and customer data management arrangement for convenient on-line access, such as via the Internet, to customer billing and inventory data. With the present invention, a user can analyze billing data for fraud control, internal auditing, inventory management, and cost accounting using an Internet browser and Internet capable computer terminal. Analysis is done by creating report definitions specifying the database data to display, sort, total/count, group, and selectively filter.

In accordance with a further aspect of the present invention, users can create custom database tables and input their own data therein. This data can be displayed in reports along with billing and inventory data. As a result, the present invention provides the ability to eliminate traditional hard copy reports such as a paper telephone bill mailed to each customer premise.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
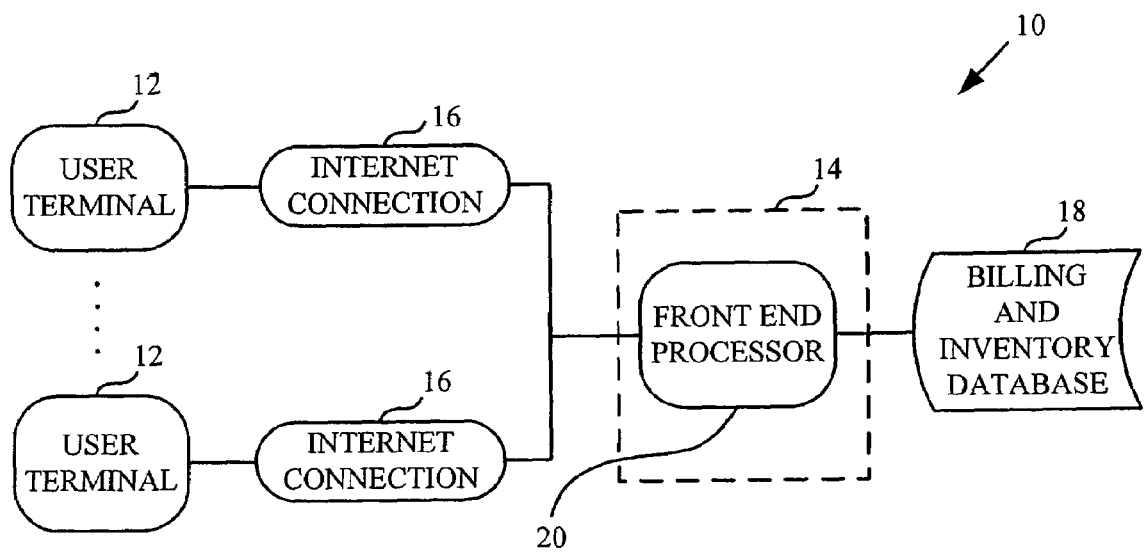
FIG. 1 is a block diagram of an Internet based database report writer and customer data management system in accordance with the present invention.

Referring to FIG. 1, an Internet based database report writer and customer data management system 10 in accordance with the present invention includes suitable programming to operate in conjunction with available Internet-type browser software. At least one customer/end user terminal 12 is connected to a host site 14 via a suitable Internet link on-line access 16.

In accordance with the present invention, an end user 12 can obtain from the host site one or more reports containing customer information stored in a database 18. In the preferred embodiment, such information relates to billing and other related customer data. In addition, interfacing between the host site and an end user is preferably done using JAVA applets and HTML pages or equivalents thereof. However, this is not to be construed as limiting since the present invention can be used with any information delivery format capable of supporting a GUI type interface. As noted above, each user can access the views and reports using a conventional Internet browser.

The host site 14 includes front-end processor 20 for interfacing with the end users via the Internet connection. Front-end processor 20 can be implemented using any suitable web server hardware or other microprocessor based central terminal. The front-end logic generally operates to collect and transmit session information through the use of JAVA applets and HTML forms described below.

Figure 2:
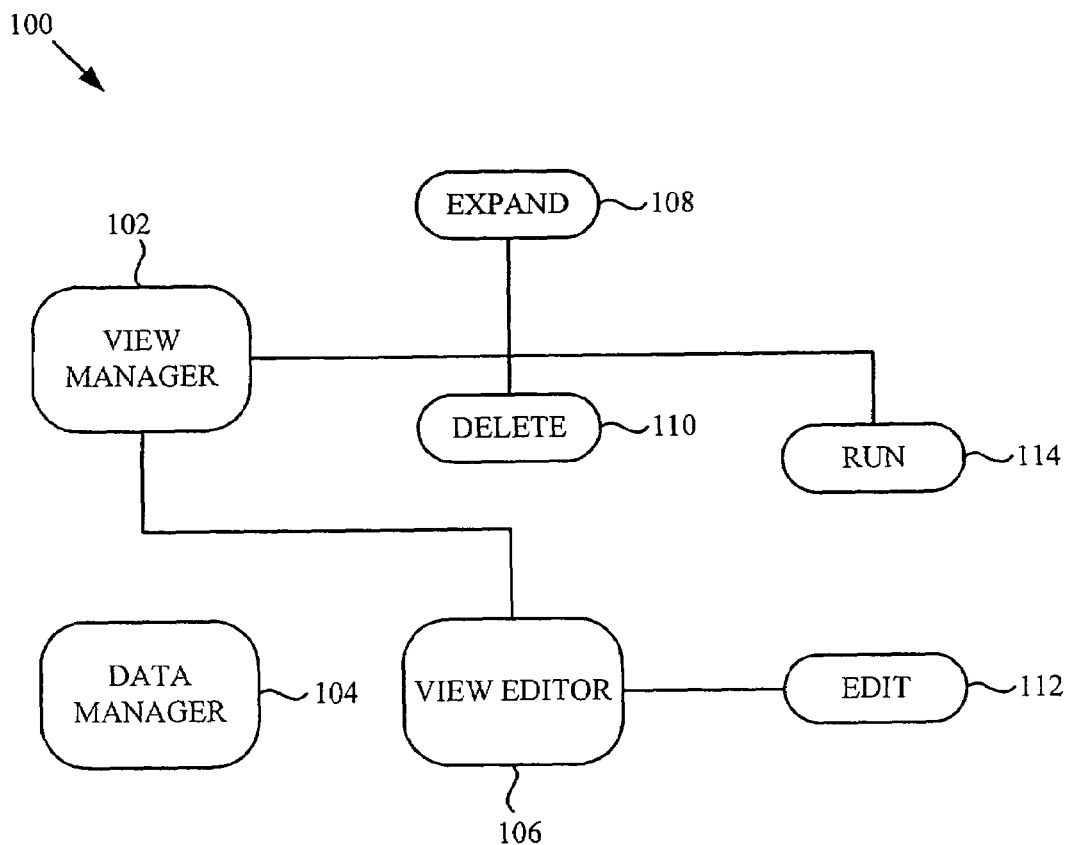
FIG. 2 is a block diagram illustrating the overall process of the report writer in accordance with the present invention.

FIG. 2 illustrates the overall process of a database report writer and customer data management arrangement 100 in accordance with the preferred embodiment. User access to arrangement 100 is provided through a main GUI type web page interface 100. From this interface, the user can access a view manager 102 hereinafter referred to as "Work with Views," or a data manager 104 hereinafter referred to as "Work with Data."

The Work with Views manager 102 is arranged to provide a graphical display of a list of the views a user can work with along with a set of function commands which can be used to manage the views. A "view" is a graphical container that stores a report definition. A report definition can be edited or created using a view editor 106 described in more detail below.

Using the Work with Views manager 102, a user can delete, run, create, edit, define a run-time filter for, extract data from, or determine the cost of running a view by selecting one of the set of predefined commands such as by double clicking with a mouse or similar input device associated function buttons graphically displayed on the Work with Views page.

The set of predefined commands provided by Work with Views manager 102 includes a directory tree type expand command 108 which expands a view by listing the reports stored therein. A delete command 110 is provided for deleting a view, which automatically deletes all reports contained therein, or an individual report within a view.

A run command 114 for running a view causes a table of contents to be displayed showing a list of all the reports contained within a selected view. Selecting a report from this list causes the report to be displayed in a predetermined area of the user display page.

A View Editor 106 allows the user to create new reports or edit existing ones. An edit command 112 is provided for selectively launching an uninitialized View Editor, or an initialized View Editor containing the definition of the report to be generated.

More specifically, in the preferred embodiment, the View Editor 106 is an Internet based editor for defining report templates to selectively control the fields of data stored in an Oracle database table to be displayed in a particular report. Such database tables are commonly employed for storing customer data, and are not suitable for direct Internet access by a user. As further described, the View Editor 106 allows for customization and storing of unique report definitions, i.e., views, thereby providing flexibility in viewing the content of Oracle database tables over the Internet. Flexibility and ease of use allow an end user to produce accessed reports locally at a user terminal 12 without the host site, i.e., the billing information or service provider, having to generate a plurality of custom programs which create the reports for each end users.

View Editor 106 is arranged in accordance with known programming code to operate within an "off the shelf" Internet browser. View Editor 106 allows the user to define a format and content of a report containing data from Oracle database tables. The user selects the fields or types of data to be generated in a report by choosing the desired columns from a list of database tables, such as titled "Business Data," that are to be added to a report. The column(s) can be added before or after a column has already been added to the report, or added as the first or last column in the report. Appropriate commands are provided to indicate where to add the column, i.e., first, last, before, or after.

Data from more than one database table can be included in the report by simply scrolling through a list of database tables displayed in the web page interface and selecting a column from the available table(s). If selected, the tables will be joined when the report is executed.

Figure 3:
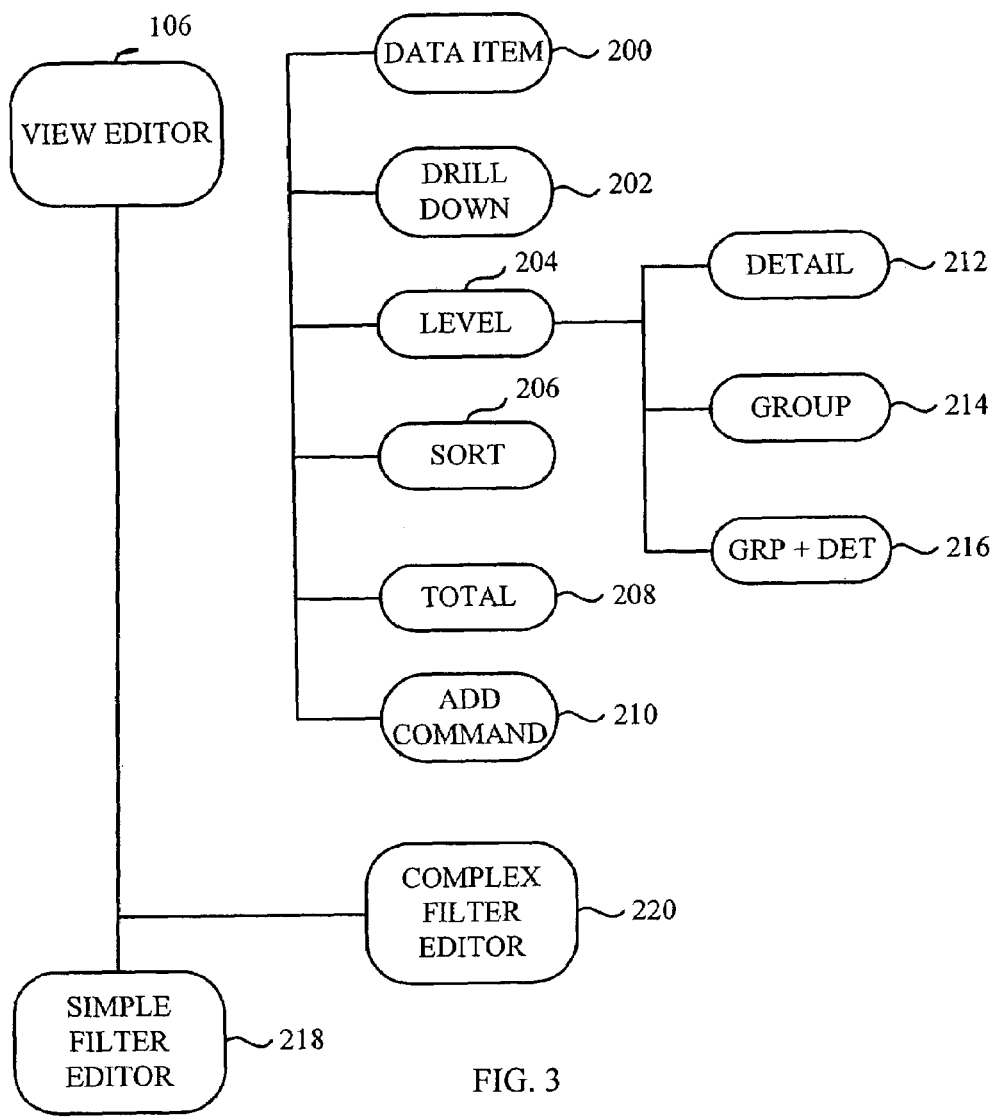
FIG. 3 is a block diagram of a view editor in accordance with the present invention.

Referring now to FIG. 3, the View Editor 106 includes a plurality of command selections for implementing desired editing functions. These plurality of commands include a Data Item command 200, a Drill Down command 202, a Level command 204, a Sort command 206, and a Total command 208. In addition, an add command function 210 is provided to add selected columns to a report.

The drill down command 202 allows the user to identify which report to drill down to when the report is run. When the drill down command is selected, a list of views and corresponding reports within those views is displayed. The user selects the view or report to be drilled down.

The level command 204 is provided to allow grouping of data in the report. Level command 204 is used to launch a Detail command 212, a Group command 214, and a Grp+Det command 216 to allow a selected column to be used as a grouping column. This will cause a group line to be inserted in the generated report every time the value of the column changes. The group line will contain all columns assigned a level of "Group."

The report can also contain both group lines and detail lines. This feature is selected by launching Grp+Det command 216. The grouping function of level command 204 is disabled by launching Detail command 214.

Sort command 206 provides sorting of a selected column in either ascending or descending order. Total command 208 is used to total numeric columns or count nonnumeric columns. Launching this command causes the word "Total" to be graphically displayed if the column is numeric, or the word "Count" if the column is nonnumeric.

Headers and footers can be selectively created by entering text in predetermined entry fields located above and below the scrollable viewing area. The header will appear near the top of the report and the footer at the bottom.

In further accordance with the present invention, accessing a simple filter editor 218 allows quick and easy creation of a report content filter. More specifically, editor 218 is formed as a selection window for entry of custom filter values which operate as a threshold for comparison with database columns to selectively control which database rows will be included in a report. The filter created using the simple filter editor is preferably displayed graphically, such as in a window box titled "Business Data Filter."

For more complex filtering, a complex filter editor 220 can be accessed. The filter created using complex filter editor 220 is also preferably displayed in the box titled "Business Data Filter."

After editing is complete, the user can then save the view or report. Once saved, a user can generate and receive a report using the saved view to access the desired data currently stored in the Oracle database.

A filter can be defined before running a report if the user wants to limit the amount of data a report will contain, such as by limiting the report to a particular date. Thus, the filter provides a mechanism for reducing the size of a report.

Referring again to the Work with Views manager 102, extracting a view or report causes all the data that would be contained in the body of the report(s) if generated to be downloaded to a file on the user's workstation. Copying a view or report allows the user to copy an existing view or report.

The cost of a running a view or report is determined by the amount of data contained therein if the report were to be generated. Launching this command preferably causes a window to be displayed containing this information.

The Work with Data manager 104 displays a current listing of custom database tables created by the user along with a set of function commands used to manage them. The user can insert data into a database table, delete data from a database table, delete an entire database table, browse an existing database table, or create a new database table.

Figure 4:
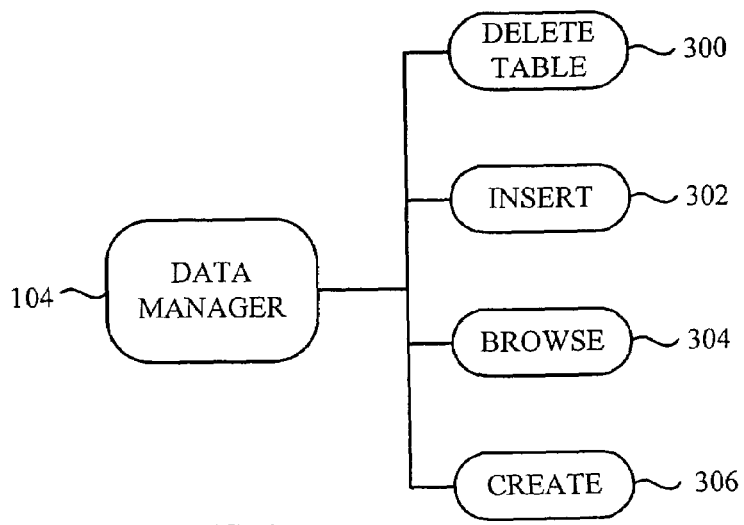
FIG. 4 is a block diagram of a data manager in accordance with the present invention.

More specifically, as shown in FIG. 4, a table delete command 300 causes the table contents to be deleted as well the table definition itself. An insert command 302 allows insertion into a database table by entering a value for each column of the table. A browse command 304 causes a window to be displayed showing the contents of the database table. A row of the table can be selected for updating or deleting.

A create command 306 allows creation of a new table. The user enters a database table name and the name, type of data, length of data, and the number of decimal places (for numeric data) for each column of the database table being created.

Work with Data manager 104 allows a user to relate the customer billing and inventory data with data the customer provides and maintains. For example, a customer may use particular cost accounting codes which are assigned to particular telephone numbers to track telephony expenses. If a cost accounting table were created containing these codes along with the corresponding assigned telephone numbers, the customer could display this information along with the telephone numbers in a report. Alternatively, the telephony charges could be totaled using the assigned cost accounting, thereby allowing the customer to view billing data using the cost accounting codes as identification terms rather than the telephone number listed in the normal report.

While the best mode for carrying out the invention has been described in detail, those familiar with the art to which this invention relates will recognize various alternative designs and embodiments for practicing the invention as defined by the following claims.

What is claimed is:

1. A system for generating an on-line report containing user billing and inventory information comprising:
    a host site connected to at least one user computer terminal via an on-line interconnection, said host site comprising a database for storing the user billing and inventory information, and a processor terminal connected to the on-line interconnection for receiving user report requests and sending reports created in response to the received requests and additional on-line user input, wherein said processor terminal comprises:
    a view manager arranged to generate a set of function commands which can be selectively launched by user input to graphically display a list of available views each of which contains a report relating to particular user information stored in a database, create a new view and report, and edit a view and report; and
    a data manager arranged to relate data maintained independently from the host site on a user computer terminal with the user's billing and inventory data for display as part of a requested report, wherein at least a portion of the data maintained independently from the host computer site is displayed as part of the requested report.

2. The system of claim 1 wherein said view manager comprises a view editor arranged to receive and implement user report editing instructions.

3. The system of claim 2 wherein said view editor comprises a plurality of editing commands which are graphically displayed in the graphical user interface.

4. The system of claim 3 wherein said plurality of editing commands comprise a drill down command, a grouping command, a sort command, and a total amount command.

5. The system of claim 1 wherein the view manager further comprises a report filter arranged to receive user defined filter values for use as threshold values to selectively control which database information will be included in a report.

6. The system of claim 1 wherein the on-line interconnection comprises an Internet connection and web browser.

7. The system of claim 1 wherein the graphical user interface comprises JAVA applets and an HTML page.

8. A method for generating an on-line report containing user billing and inventory information in response to an inquiry from a user computer terminal via an on-line connection, said method comprising:
    generating a graphical user interface for on-line access by the user, said graphical user interface providing a set of function commands which can be selectively launched to graphically display a list of available views each of which contains a report relating to particular user information stored in a host site database, create a new view and report, edit a view and report, and relate data maintained independently from the host site on the user computer terminal with the user's billing and inventory data for display in a report;
    creating a report based on user responses to the set of commands;
    including at least a portion of the data maintained independently from the host computer site in the report; and
    sending the created report to the user terminal via the on-line connection.

9. The method of claim 8 further comprising providing report editing commands which can be accessed through the graphical user interface to specify desired data to be produced in a report.

10. The method of claim 9 further comprising providing report editing commands which can be accessed through the graphical user interface to specify a desired report format.

11. The method of claim 9 further comprising providing report editing commands which allow on-line user control of display, sorting, accounting, and grouping of report content.

12. The method of claim 9 further comprising providing report editing commands which allow a user to input content filtering constraints to limit the quantity of user information produced in a report.

* * * * *